United States Patent [19]

Sekiguchi

[11] Patent Number: 5,188,084
[45] Date of Patent: Feb. 23, 1993

[54] APPARATUS FOR CONTROLLING FUEL INJECTION TIMING IN A FUEL INJECTION PUMP

[75] Inventor: Akira Sekiguchi, Higashimatsuyama, Japan

[73] Assignee: Zexel Corporation, Tokyo, Japan

[21] Appl. No.: 818,257

[22] Filed: Jan. 8, 1992

[30] Foreign Application Priority Data

Jan. 25, 1991 [JP] Japan .................................. 3-23865

[51] Int. Cl.$^5$ .......................................... F02M 37/04
[52] U.S. Cl. ................................... 123/502; 123/449
[58] Field of Search ............... 123/502, 501, 449, 503, 123/357

[56] References Cited

U.S. PATENT DOCUMENTS

| 4,476,832 | 10/1984 | Fujimori | 123/502 |
| 4,503,830 | 3/1985 | Nakamura | 123/501 |
| 4,558,679 | 12/1985 | Koyanagi | 123/502 |
| 4,592,327 | 6/1986 | Fujimori | 123/502 |
| 4,617,902 | 10/1986 | Hirano | 123/501 |
| 4,638,782 | 1/1987 | Yasuhara | 123/502 |
| 4,694,807 | 9/1987 | Mori | 123/501 |
| 4,711,211 | 12/1987 | Oshizawa | 123/501 |
| 4,825,373 | 4/1989 | Nakamura | 123/501 |

FOREIGN PATENT DOCUMENTS 2133185 7/1984 United Kingdom ................ 123/502

Primary Examiner—Carl S. Miller
Attorney, Agent, or Firm—Pollock, Vande Sande & Priddy

[57] ABSTRACT

In a fuel injection timing control apparatus for fuel injection pumps having a pressure response type timer in which the timer is controlled to make an actual injection time conincident with a target injection time through PID control, a control constant for the PID control is determined so as to avoid the influence of a reaction force caused by the fuel injection.

4 Claims, 4 Drawing Sheets

APPARATUS FOR CONTROLLING FUEL INJECTION TIMING IN A FUEL INJECTION PUMP

BACKGROUND OF THE INVENTION

1. Field of the Invention

The present invention relates to an apparatus for controlling fuel injection timing in a fuel injection pump, in which the fuel injection timing is regulated by the use of a hydraulic timer, an eccentric cam type timer or the like.

2. Description of the Prior Art

U.S. Pat. No. 4,476,832, for example, discloses a fuel injection timing control system for fuel injection pumps in which hydraulic pressure applied to a timer piston of a hydraulic timer is controlled by the regulation of the degree of opening of a solenoid valve to regulate the position of a regulating member for regulating the fuel injection time.

In the disclosed system, since the disc cam comes in contact with the roller inside of the fuel injection pump and a reaction force acts to the roller holder when the plunger of the fuel injection pump is pressed, the system is arranged to avoid the occurrence of resonance in the control system owing to the integer multiple relationship between the period of the change in the magnitude of the reaction force and the pulsation period of the change in the pressure in the high-pressure chamber of the timer caused by the opening/closing operation of the solenoid valve, whereby the time of fuel injection can be controlled in a stable condition.

However, in general, the conventional fuel injection timing control system of this type is arranged in such a manner that the reaction force caused by the fuel injection is applied to the timer piston, whereby the fuel injection time can be advanced or retarded. Consequently, for the disclosed system, it follows that the control gain for retarding the fuel injection time is greater than that for advancing the fuel injection time. This causes a difference in the control response characteristics between the advance control and the retard control of the fuel injection time, and the stability of the control operation will be degraded. This disadvantage arises not only in the use of a hydraulic timer for a distribution type fuel injection pump, but also in the use of a hydraulic timer for a in-line type fuel injection pump.

SUMMARY OF THE INVENTION

It is an object of the present invention to provide an improved apparatus for controlling fuel injection timing in a fuel injection pump.

It is another object of the present invention to provide an apparatus for controlling fuel injection timing, whose operation is unaffected by the reaction force which is caused by the fuel injection and applied to the timer According to the present invention, in a fuel injection timing control apparatus for fuel injection pumps which has a pressure response type timer for regulating the position of a regulating member for regulating fuel injection timing in the fuel injection pump, a first determining means for determining a target fuel injection time, a detecting means for detecting the actual fuel injection time and a control means responsive to the first determining means and the detecting means for controlling the timer to make the actual injection time coincident with the target injection time through PID control, the system comprises a discriminating means for discriminating which of the target fuel injection time and the actual fuel injection time is more advanced, and a second determining means for determining a control constant for the PID control so as to avoid the influence of a reaction force which is caused by the fuel injection and applied to the timer in accordance with the result discriminated by the discriminating means.

The actual injection time is compared with the target injection time by the discriminating means to discriminate whether the actual injection time should be advanced or retarded. In the case where the reaction force occurring at the time of fuel injection is applied to the regulating member for regulating the injection time so as to, for example, retard the injection time, the control constant for PID control is determined by the second determining means in such a way that the control constant for advancing the injection time is greater than that for retarding the injection time. Consequently, in the case where the control operation for advancing the injection time is carried out against the reaction force in order to make the actual injection time coincident with the target injection time, the control gain at this time becomes greater as compared with that for the retard control operation of the fuel injection time.

As a result, the control response characteristics for advancing the injection time becomes equal to that for retarding the injection time even if the reaction force caused by the fuel injection is applied to the timer to retard the injection time. This advantage will be obtained even in the case where the reaction force owing to the fuel injection acts to advance the fuel injection time.

The invention will be better understood and other objects and advantages thereof will be more apparent from the following detailed description of preferred embodiments with reference to the accompanying drawing.

DESCRIPTION OF THE PREFERRED EMBODIMENTS

Figure 1:
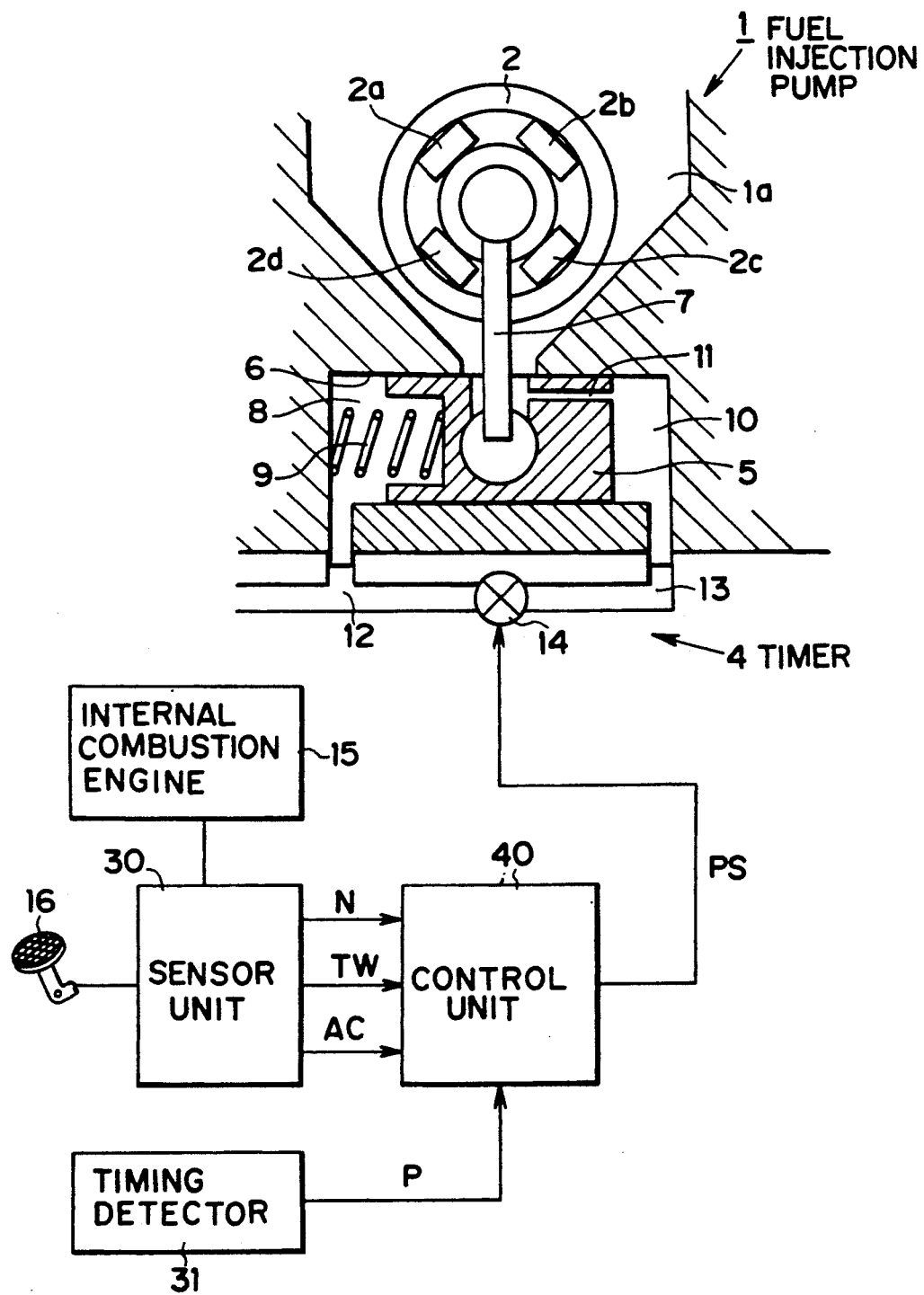
FIG. 1 is a schematic view of an embodiment of a control system for controlling fuel injection timing in fuel injection pump according to the present invention.

FIG. 1 is a schematic view illustrating an embodiment of a control system for controlling fuel injection timing in a fuel injection pump according the present invention. Reference numeral 1 designates a distribution type fuel injection pump having a roller holder 2. Rollers 2a to 2d mounted on the roller holder 2 are in pressure contact with a disc cam (not shown) which serves to reciprocally move a plunger (not shown) along its axis.

The roller holder 2 is arranged to be able to turn within a prescribed angle range in the direction of its circumference, and the fuel injection timing in the fuel injection pump 1 can be regulated by regulating the angular position of the roller holder 2. The fuel injection pump 1 is provided with a hydraulic type timer 4 of well-known design for regulating the angular position of the roller holder 2 so as to regulate the fuel injection time. In FIG. 1, reference numeral 5 designates a timer piston which is installed in a cylinder 6 communicating with a housing chamber 1a of the fuel injection pump 1 so as to be movable along its axis. One end portion of a rod 7 having its other end portion rigidly fixed to the roller holder 2 is connected with the timer piston 5 in the conventional manner in such a way that the timer piston 5 is positioned in accordance with the rotational angle position of the roller holder 2. The timer piston 5 is biased in the right hand direction in FIG. 1 by an expansion spring 9 received in a first chamber 8 in the cylinder 6. A second chamber 10 defined in the cylinder 6 communicates through an orifice 11 with the housing chamber 1a and pressurized fuel supplied into the housing chamber 1a is supplied to the second chamber 10 therethrough.

The first chamber 8 communicates with one opening of a passage 12 having another opening communicating with a fuel tank (not shown), whereby the inner pressure of the first chamber 8 is always kept equal to the inner pressure of the fuel tank. On the other hand, the second chamber 10 communicates with the passage 12 through a passage 13 having a solenoid valve 14 midway thereof. The ON/OFF operation of the solenoid valve 14 is controlled in response to a pulse signal PS produced by a control unit 40 in response to the output of a sensor unit 30.

The average opening degree of the solenoid valve 14 is controlled in accordance with the duty cycle of the pulse signal PS as will be described later to regulate the inner pressure of the second chamber 10, whereby the angular position of the roller holder 2 can be controlled so as to obtain a desired fuel injection time.

The sensor unit 30 is arranged to produce a speed signal N showing the rotational speed of an internal combustion engine 15 associated with the fuel injection pump 1, a coolant temperature signal TW showing the temperature of the coolant of the internal combustion engine 15 and an acceleration signal AC showing the amount of operation of an accelerator pedal 16. A timing detector 31 produces timing signal P indicating the actual fuel injection time TA in terms of the position of the timer piston 5. The signals from the sensor unit 30 and the timing detector 31 are sent to the control unit 40.

Figure 2:
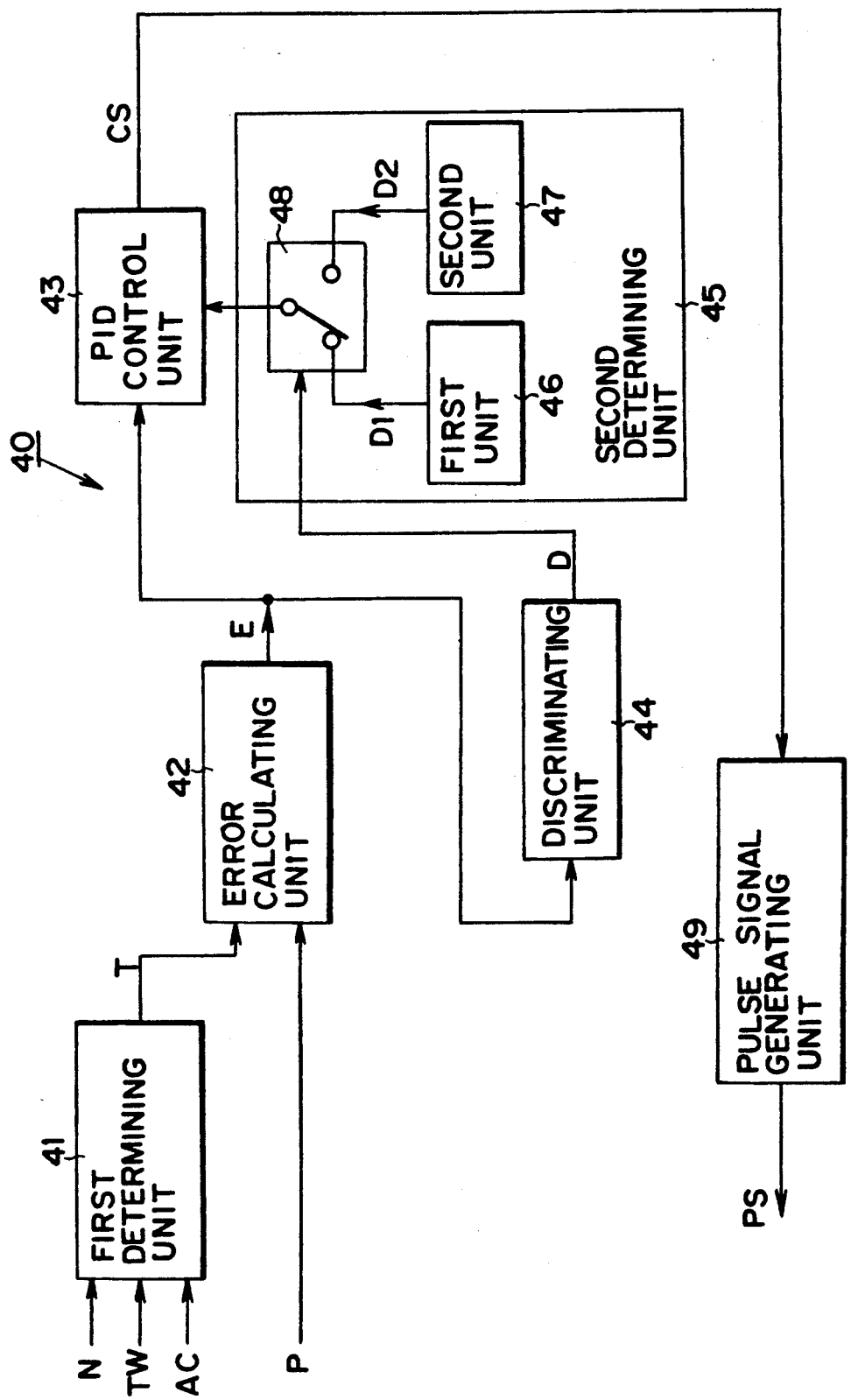
FIG. 2 is a block diagram of the control unit shown in FIG. 1.

FIG. 2 shows a block diagram of the control unit 40, which has a first determining unit 41 for determining the optimum fuel injection timing in the fuel injection pump 1 for the operating condition of the engine 15 at that time by map calculation in response to the speed signal N, the coolant temperature signal TW and the acceleration signal AC. The output signal of the first determining unit 41 is output as a target signal T representing the target injection time of fuel injected from the fuel injection pump 1 at each instant.

The target signal T is sent to an error calculating unit 42 receiving the timing signal P, wherein the actual injection time TA represented by the timing signal P is subtracted from the target injection time TT represented by the target signal T to produce an error signal E indicating the difference. The error signal E is sent to a PID control unit 43 for processing the error signal E to obtain a control signal CS for PID control of fuel injection timing effected by the timer 4.

In order to determine the PID constant used for PID control operation carried out in the PID control unit 43 in accordance with the result of the comparison between the target injection time and actual injection time of fuel, the control unit 40 has a discriminating unit 44 and a second determining unit 45.

The discriminating unit 44 discriminates which is more advanced between the target injection time TT and the actual injection time TA of fuel on the basis of the error signal E and produces a discrimination signal D whose level becomes high when TT is less advanced than TA while low when TA is less advanced than TT.

The second determining unit 45 has a first unit 46 for generating a set of PID constant data $D_1$ for obtaining of PID constant data $D_2$ for obtaining small control gain.

These data $D_1$ and $D_2$ are input to a switch 48 whose switchover operation is controlled in accordance with the status of the discrimination signal D, and one of them is selected depending upon the status of the discrimination signal D. The data selected by the switch 48 is used as a PID constant for the PID control operation in the PID control unit 43.

In this embodiment, the timer piston 5 installed in the timer 4 is accommodated in the fuel injection pump 1 so as to be moved to retard the injection time when the reaction force owing to the fuel injection occurs. Accordingly, when the injection time should be controlled so as to be advanced because TA is less advanced than TT, the status of the discrimination signal D becomes high and the switch 48 is controlled to select the data $D_1$, whereby the control gain becomes greater as compared with the case where TA is more advanced than TT and the effect of the reaction force caused by the fuel injection is degraded. On the other hand, when TA is not less advanced than TT, the status of the discrimination signal D becomes low level, so that the switch 48 is controlled to select the data $D_2$.

As will be understood from the foregoing description, in the case where the reaction force caused by the fuel injection makes the timer piston move in such a way that the injection time is advanced, the switch 48 should be arranged to select the data $D_1$ when the level of the discrimination signal D is low, and to select the data $D_2$ when the level of the discrimination signal D is high.

The control signal CS is input to a pulse signal generating unit 49 for generating the pulse signal PS which serves to regulate the degree of the opening of the solenoid valve 14, and the pulse signal generating unit 49 generates the pulse signal PS of the duty cycle necessary for obtaining a desired target injection time on the basis of the control signal CS.

According to the arrangement shown in FIGS. 1 and 2, the error calculating unit 42 is responsive to the target injection time determined by the first determining unit 41 and the actual injection time detected on the basis of the position of the timer piston 5 and calculates the difference between them. Then, feed-back control is carried out in a PID control mode on the basis of the difference to regulate the actual injection time.

In this case, the target injection time TT and the actual injection time TA are compared by the discriminating unit 44 to produce the discrimination signal D showing the result of the comparison. The second determining unit 45 is responsive to the discrimination signal D to determine the PID control constant used in the PID control unit 43 by taking account of the reaction force by which the timer piston 5 is moved so as to retard the fuel injection time owing to the fuel injection.

Thus, when the injection time should be advanced because of TT being the same as or more advanced than TA in the case where the timer piston 5 is urged by the reaction force caused by the fuel injection so as to retard the injection time, the data $D_1$ is selected to increase the control gain of the fuel injection time control loop. On the other hand, when the injection time should be retarded because of TT being less advanced than TA in the case where the timer piston 5 is urged by the reaction force so as to retard the fuel injection time, the data $D_2$ is selected to decrease the control gain of the fuel injection time control loop.

As a result, even if the timer piston 5 receives the reaction force for advancing or retarding the fuel injection time owing to the fuel injection, it is possible to make the control response characteristics for advancing the fuel injection time to be approximately equal to that for retarding the fuel injection time during the control operation for regulating the actual fuel injection time so as to be equal to the target fuel injection time. As a result, the fuel injection time can be controlled in good condition even if the reaction caused by the fuel injection is applied to the timer piston.

In addition, the actual fuel injection time may be detected by, for example, comparing the time of the lift of the valve needle of a fuel injection valve with the time of the top dead center of the piston of the engine in the compression stroke, instead of by the detection of the position of the timer piston 5.

Furthermore, the arrangement of the control unit 40 is not limited to that of the embodiment shown in FIG. 2, and almost substantially the same functions can be obtained by using, for example, a microcomputer for executing a predetermined control program.

Figure 3:
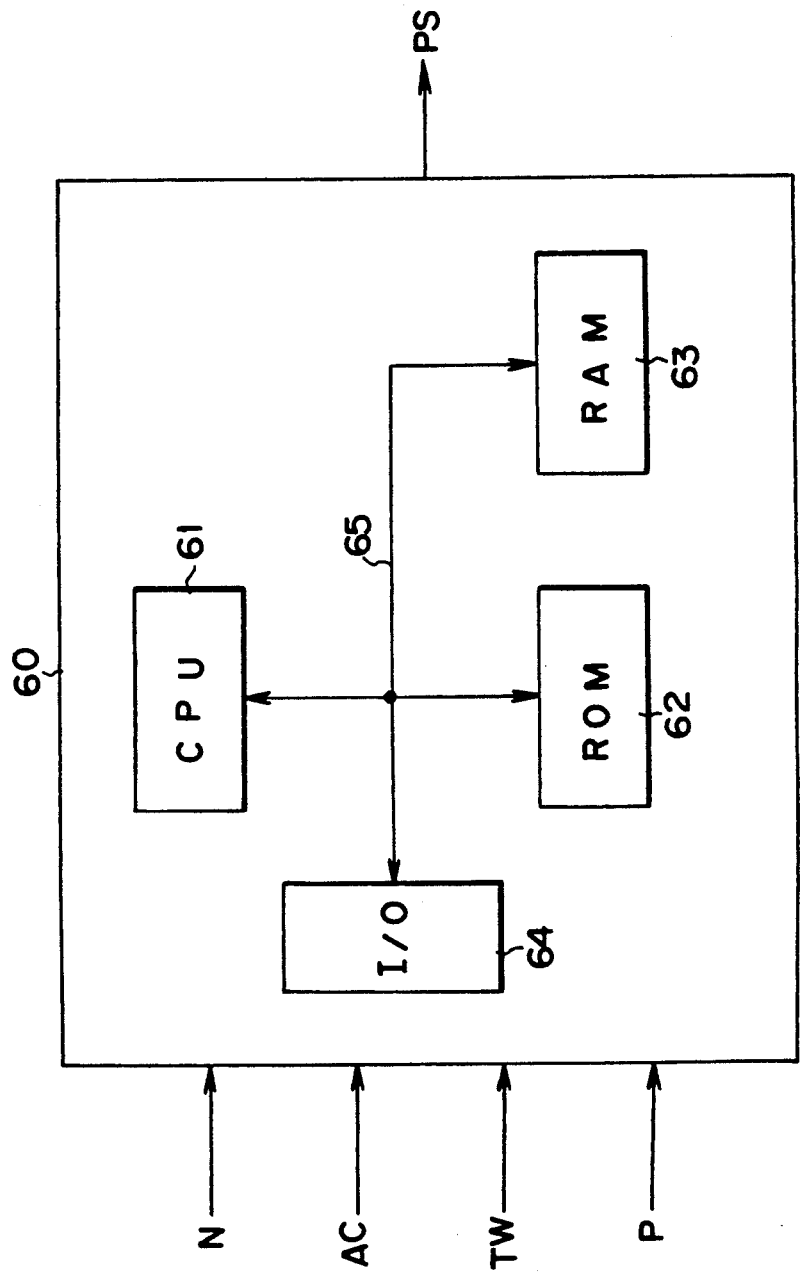
FIG. 3 is a block diagram of a microcomputer used as a control unit.

FIG. 3 is a block diagram of a microcomputer 60 for executing a control program in order to obtain the pulse signal PS. The microcomputer 60 is a system of well-known design which has a central processing unit (CPU) 61, a read-only memory (ROM) 62, a random access memory (RAM) 63, an input/output interface (I/O) 64 and a bus 65 for interconnecting them. The ROM 62 stores the control program for controlling the fuel injection timing in the fuel injection pump 1.

Figure 4:
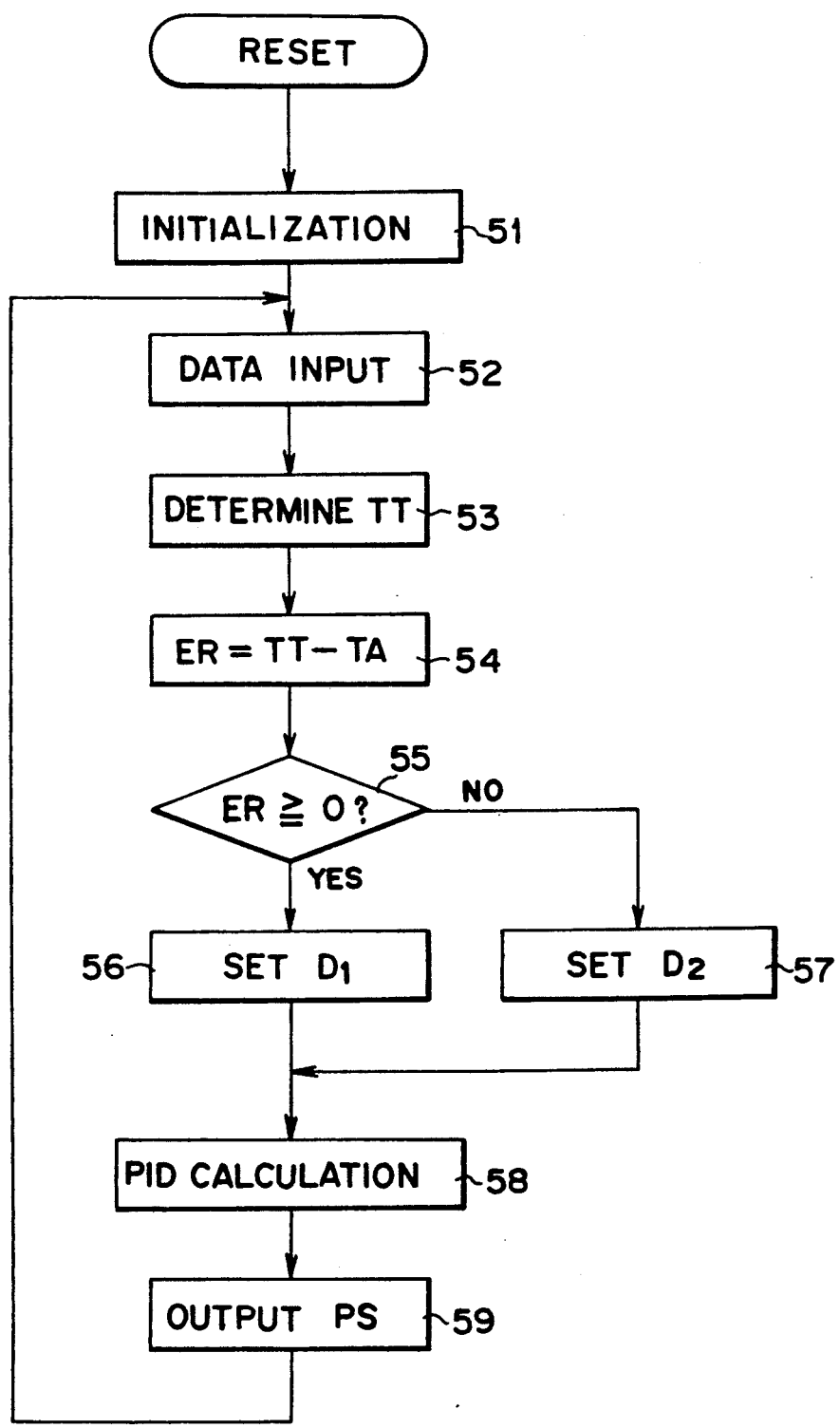
FIG. 4 is a flowchart showing the control program executed in the microcomputer for controlling the fuel injection timing in the fuel injection pump.

FIG. 4 shows a flowchart of the control program which is executed in the microcomputer 60 shown in FIG. 3. Referring to FIG. 4, after the activation of the control program, the operation moves to step 51 in which the system is initialized, and the signals generated by the sensor unit 30 and the timing detector 31 are read in in step 52. The input signals in an analog form are converted into digital form.

In the next step 53 the optimum fuel injection time for the operating condition of the internal combustion engine 15 is calculated on the basis of the signals supplied to the microcomputer 60 to obtain the target injection time TT.

The operation moves to step 54, wherein TA is subtracted from TT in order to obtain the amount of ER. TA represents the actual injection time determined by the timing signal P. Then, the operation moves to step 55, in which discrimination is made as to whether or not the value of ER is equal to zero or more. The determination in step 55 becomes YES when the value of ER is equal to or more than zero, and the operation moves to step 56 wherein the data $D_1$ is set as the PID control constant data. On the other hand, the determination in step 55 becomes NO when it is found that the value of ER is less than zero, and the operation moves to step 57 wherein the data $D_2$ is set as the PID control constant data.

After the appropriate PID control constant is set in step 56 or 57, the signal processing operation for PID control is effected with respect to the data ER in step 58 on the basis of the PID control constant set in step 56 or 57. The duty cycle of the pulse signal PS is determined in accordance with the result of the signal processing operation to produce the pulse signal PS in step 59.

As a result, the same control operation as that according to the arrangement shown in FIG. 2 can be carried out by execution of the control program illustrated in FIG. 4, and an effect similar to that according to the arrangement shown in FIG. 2 is obtained.

In the foregoing description, one embodiment is described by way of example of the fuel injection timing control system using a distribution type fuel injection pump installed with a hydraulic type timer, but the present invention is not limited to this arrangement, and it is widely usable in arrangements employing, for example, another type of fuel injection pump with an eccentric cam type timer, whose operation for regulating fuel injection time is also effected by the reaction caused by the fuel injection. That is, the present invention is widely applicable for pressure response type timers to remove the disadvantages of advance and/or retardation in the injection time owing to the reaction caused by the fuel injection.

What is claimed is:

1. A fuel injection timing control apparatus for a fuel injection pump which has a pressure response type timer for regulating a position of a regulating member for regulating fuel injection timing in the fuel injection pump, said apparatus comprising:

first determining means for determining a target fuel injection time;

detecting means for detecting a actual fuel injection time;

discriminating means responsive to said first determining means and said detecting means for discriminating which is advanced between the actual fuel injection time and the target fuel injection time at the instant of fuel injection;

second determining means for determining in accordance with the result discriminating by said discriminating means a control constant for a PID control operation of the position of the regulating member so as to avoid the influence of a reaction force which is caused by fuel injection of the fuel injection pump and applied to the timer; and, control means responsive to said first determining means and said detecting means for controlling the timer to make the actual injection time substantially equal to the target injection time through PID control using the control constant determined by said second determining means.

2. An apparatus as claimed in claim 1, wherein said timer is a hydraulic type timer associated with the fuel injection pump.

3. An apparatus as claimed in claim 1, wherein said second determining means has a first means for generating a first set of PID constant data for obtaining large control gain in the PID control operation, a second means for generating a second set of PID constant data for obtaining small control gain in the PID control operation, and means for selecting one of the first and second set of PID constant data in response to a result of a discrimination of said discriminating means.

4. An apparatus as claimed in claim 1, wherein the PID control operation is carried out on the basis of a difference between the actual and target injection times.

* * * * *

UNITED STATES PATENT AND TRADEMARK OFFICE
CERTIFICATE OF CORRECTION

PATENT NO. : 5,188,084
DATED : February 23, 1993
INVENTOR(S) : Akira Sekiguchi

It is certified that error appears in the above-identified patent and that said Letters Patent is hereby corrected as shown below:

Column 6, line 35, change "a" to --an--.

Column 6, line 43, change "discriminating" to --discriminated--.

Signed and Sealed this

Ninth Day of November, 1993

Attest:

BRUCE LEHMAN

*Attesting Officer*     *Commissioner of Patents and Trademarks*